US012482270B2

(12) United States Patent
Kaarnametsä et al.

(10) Patent No.: US 12,482,270 B2
(45) Date of Patent: Nov. 25, 2025

(54) PRODUCTION SYSTEM AND METHOD FOR FORESTRY APPLICATION (71) Applicant: Deere & Company, Moline, IL (US)

(72) Inventors: Johannes Kaarnametsä, Tampere (FI); Heikki Pyykkö, Tampere (FI); Aki Putkonen, Tampere (FI); Mikko Palmroth, Tampere (FI)

(73) Assignee: DEERE & COMPANY, Moline, IL (US)

( * ) Notice: Subject to any disclaimer, the term of this patent is extended or adjusted under 35 U.S.C. 154(b) by 119 days.

(21) Appl. No.: 18/599,477

(22) Filed: Mar. 8, 2024

(65) Prior Publication Data
US 2025/0029389 A1 Jan. 23, 2025

(30) Foreign Application Priority Data
Jul. 17, 2023 (EP) .................... 23185915

(51) Int. Cl.
G06V 20/56 (2022.01)
A01G 23/00 (2006.01)
(Continued)

(52) U.S. Cl.
CPC ............ *G06V 20/56* (2022.01); *A01G 23/00* (2013.01); *G06V 10/751* (2022.01);
(Continued)

(58) Field of Classification Search
CPC .... G06V 20/56; G06V 10/751; G06V 20/188; A01G 23/00; G05D 2105/15; G05D 2101/22; G05D 1/692; G06Q 50/02
See application file for complete search history.

(56) References Cited

U.S. PATENT DOCUMENTS

2004/0250908 A1 12/2004 Hicks
2009/0278839 A1 11/2009 Geis et al.
(Continued)

FOREIGN PATENT DOCUMENTS

EP 3141108 B1 10/2019
WO WO 2019220351 A1 11/2019

OTHER PUBLICATIONS

Ola Lindroos et al., Drivers of Advances in Mechanized Timber Harvesting—a Selective Review of Technological Innovation, dated Jun. 9, 2017, pp. 243-258, [online]. Retrieved from the Internet <URL: https://www.researchgate.net/publication/319716065_Drivers_of_Advances_in_Mechanized_Timber_Harvesting_-_a_Selective_Review_of_Technological_Innovation>.
(Continued)

Primary Examiner — Naeem Taslim Alam (57) ABSTRACT

A production system for a forestry application comprising a server and a wireless production network, configured to be connected to forest machines and vehicles, at least one forestry harvester vehicle and one forwarder vehicle, the vehicles having a wireless data connection to the production system server and network, having a positioning system, identify the type of processed logs, measure the amount of processed logs, measure the lengths of processed logs, measure the quality of the processes logs, visually record the vehicle surroundings, process the recorded images to identify objects, store them, and send them via the production network, the vehicles having a display so that the vehicle operator may compare images with different time stamps, the system adapted to visualize changes between the images based on the identified objects and time stamps, so that the vehicle operator may identify tracks, objects, logs, log piles during visually impaired conditions.

15 Claims, 6 Drawing Sheets (51) Int. Cl.
   *G05D 1/692* (2024.01)
   *G05D 101/00* (2024.01)
   *G05D 105/15* (2024.01)
   *G06Q 50/02* (2024.01)
   *G06V 10/75* (2022.01)
   *G06V 20/10* (2022.01)

(52) U.S. Cl.
   CPC ........... *G06V 20/188* (2022.01); *G05D 1/692* (2024.01); *G05D 2101/22* (2024.01); *G05D 2105/15* (2024.01); *G06Q 50/02* (2013.01)

(56) References Cited

U.S. PATENT DOCUMENTS

| | | | | |
|---|---|---|---|---|
| 2013/0235205 | A1* | 9/2013 | Lappalainen | G06Q 50/02 348/148 |
| 2019/0008100 | A1 | 1/2019 | Hollmeier et al. | |
| 2020/0120882 | A1* | 4/2020 | Edvardsson | A01G 23/00 |
| 2020/0226393 | A1 | 7/2020 | Han | |
| 2021/0176926 | A1* | 6/2021 | Johansson | H04N 7/18 |
| 2021/0248735 | A1* | 8/2021 | Edvardsson | G06T 7/0004 |
| 2023/0091837 | A1 | 3/2023 | Saxena et al. | |

OTHER PUBLICATIONS

Tuomo Palonen et al., Augmented Reality in Forest Machine Cabin, dated Jul. 2017, pp. 1-8, [online]. Retrieved from the Internet <URL: https://www.researchgate.net/publication/320493924_Augmented_Reality_in_Forest_Machine_Cabin/download?_tp=eyJjb 250ZXh0Ijp7ImZpcnNOUGFnZSI6lI9kaXJlY3QiLCJwYWdlIjoiX 2RpcmVjdCJ9fQ>.

Extended European Search Report and Written Opinion issued in European Patent Application No. 25152352.8 dated Apr. 17, 2025, in 08 pages.

Kaarnametsä et al., Forestry imaging data view and analysis system, EP Patent Application No. 25152352.8, filed Jan. 16, 2025.

* cited by examiner

PRODUCTION SYSTEM AND METHOD FOR FORESTRY APPLICATION

CROSS-REFERENCE TO RELATED APPLICATIONS

This application claims priority under 35 U.S.C. § 119 to patent application EP 23185915.8, filed on 17 Jul. 2023, the disclosure of which is incorporated herein by reference.

FIELD OF THE DISCLOSURE

The present disclosure relates to a system and method for forestry application, which enables time independent and environment independent information about forestry application operations.

BACKGROUND OF THE DISCLOSURE

Forest felling operations include prework analysis of the forest area or work area before commencing forestry application operations. Common methods involve a collection of data on the work area via satellite, aerial and terrestrial drone vehicles, manual collection, or mobile devices on vehicles, such as Lidar or radar imaging. The data is collected, analyzed, and extracted. This data usually comprises tree locations, terrain surface and shape, route logistics for the work vehicles, work planning, tree types and expected log quality.

The felling operations transforms the trees into logs of specified lengths which are placed in log piles or assortments at each worksite or grouping of trees. A work area may have multiple work sites, depending on the size of the work area. After felling operations, additional data is collected for the resulting log assortments, the size and number of logs, the resulting quality of the logs and the logistics for necessary transport.

US20040250908A1 discloses a work distribution system where static data is distributed to the vehicles prior to the work shift. US20090278839A1 discloses a computer showing GIS information to the vehicle operator based on previous acquired data.

During transport operations, the logs and log piles are constantly changing. Location data for the logs changes and the piles become smaller at a first location while being aggregated at a second location for sorting or road transport. This makes constant tracking necessary, which requires the identification of each log in the production system.

The forestry application operations are influenced by changing terrain conditions, either due to vehicle traffic or due to changing weather influence. Precipitation or frost may render a road section not suitable for vehicles, snow may hide the tracks or make orientation cumbersome for the operators and logs and objects may be difficult to identify by the operator or by automated identification processes. Light conditions may slow down the production process as well.

The influences on the forestry application operations require manual data input in the production system to correct locations, log data, and logistic changes. The present disclosure overcome the need for manual data input with a production system and method as presented.

SUMMARY OF THE DISCLOSURE

The disclosure describes a production system for a forestry application operation comprising a server and a wireless production network, adapted to be connected to forest machines and vehicles. At least one of forestry harvester vehicle and one forwarder vehicle, the vehicles adapted to having a wireless data connection to the production system server and network. The vehicles having a positioning system. The vehicles configured to identify the type of processed wood, measure the amount of processed logs, measure the lengths of processed wood or logs, measure the quality of the processes wood or logs, visually record the vehicle surroundings during driving and processing, process the recorded images to identify objects on the ground, logs, log piles, trees, road tracks, time stamp the recorded and the processed images and store them and send them via the production network. The vehicles having a display enabled to allow access and to display the images in the vehicle cabin. The vehicle operator is enabled to compare images with different time stamps, the system adapted to visualize changes between the images based on the identified objects and time stamps, so that the vehicle operator is enabled to identify tracks, objects, logs, log piles during visually impaired conditions at the present time.

The production system enables real time data exchange between the vehicles and the central server. The wireless network enables the real time process evaluation and the planning of the production process based on the current data flow, analysis, and position of the vehicles. The vehicles identify the wood types in the work area which are directly transferred to the production system together with the amount of processed wood of that quality based on the measurements in the felling head of the harvester vehicle. The placement and volume of the logs after processing the tree is detected and transferred to the production system for directing the forwarder vehicle to the correct location and to enable load planning for the exact routes to be taken by the forwarder vehicle. The vehicles in general are detecting objects along their travel path and during working which are transferred to the production system network for use by all vehicles and for planning logistics in the work area. The recorded images are analyzed for objects and added with information about the recording time. The time stamp is used as a reference by the operator to identify changes of the situation in the work area either by visual inspection alone or by the identification of changed object of the production system. Changes in the images are analyzed by the production system and displayed to the operator and the office personal which enables exact tracking of changes, the detection of the current production rate and further planning of the workload.

In another embodiment the system can be adapted to receive the images, identify changes from the time stamped and processed images and to calculate current work site conditions as a result on a map to display in the vehicles.

The vehicle operator is enabled to plan the workload and to make fact-based decisions. Way finding and log transport and locations are revealed without any effect of light or weather conditions. Should a current work site offer challenges to the operator for finding the correct trees, logs or path, the production system displays an earlier image, and the operator is enabled to track the necessary information. The production system also displays identified object on the processed images to enable the operator to track any changes in the present conditions and changes in the objects, such as already transported logs, moved log piles or changed tracks on the ground.

In another example the system can be adapted to match object changes from the processed images to work process of the work area by identifying logs and movement of logs and enable tracking through the work area.

The production system enables the operators, both in the vehicle as well as the work oversight operators, to plan the next work steps based on real time data transferred over the network. The tracking of log or wood and the logistic planning is achieved with reduced workload and high accuracy. The tracking avoids losing logs or piles during the work, and reducing the cleanup effort after completion. The tracking enables the road placement of logs with high accuracy and reduces planning effort of transport.

In a further embodiment the system can be adapted to enable communication between the vehicles, the production network, and the server so that data and images from each vehicle is added to the production system data network and each vehicle is enabled to receive data updates on the work site via the production network.

The real time update of data and the constant communication of the server and all clients ensures accurate data on the vehicles so that the operators are enabled to make on time decisions about the workload, the routing, and planning of the forest work.

In another example the positioning system can use GPS data and transfers the vehicle position by the production network.

The GPS system allows real time tracking of the planning personal and on time decisions about the vehicle locations and distribution throughout the work area. Planning effort is reduced and the timely response to current problems is ensured. Vehicles may have malfunctions and forest roads may be unpassable so that a timely reaction is advantageous. The system enables the display of the vehicle positions on a map and reduces the communication effort and workload of all involved personal.

In an embodiment the network data can be transferred between the vehicle and the production network by wireless signal, preferably by using wireless network protocols.

The wireless transfer ensures timely data exchange between all clients of the network over high distances. Additional antennas may be provided in the work area to ensure network connection in all areas.

In another embodiment the wood identification can use the onboard camera and a lookup table.

The camera is recording the images and the system uses software-based detection of objects in the images. This can be based on a database having reference tables with the available wood types and quality levels of the wood or a lookup table with the referenced wood types and quality. The system may also enable the detection tree maladies such as rot, pathogens, bacterial effect, or insect damages. Such wood or logs may be sorted out and be used to determine possible countermeasures in the forest area.

In another example the length measurement can be facilitated by the felling head/processing head of the harvester vehicle.

The harvester head or felling head may have a length measurement tool, like a length measurement wheel, or a laser end finding device. The measurement enables the production system to detect the harvested log meters and to save this information in the database and share the data via the network. The length detection allows accurate planning of the production rate and the correct handling later in the logistics and load calculation of the forwarder vehicle.

In an embodiment the images recorded by the onboard camera can be processed by software to identify objects.

The software algorithm identifies objects on the images. The camera may be enabled to collect stereo images, further other image taking devices, such as lidar or drone camera may be provided. The identified objects are transmitted to the production system network and the server so that the object data can be shared throughout the network and distributed to all connected clients, vehicles, office applications and the like. The objects are also embedded in the map application available for the vehicle operator so that the objects are trackable even if the current environment makes a visual inspection impossible, such as a snow cover, darkness, mud, flooded ground, fog.

In another example an additional lidar and/or radar can be provided on the vehicle to detect and measure the tree density and/or objects in the work area.

Lidar or radar may be used to detect the tree density or detect objects, even when the use of a camera may not be able to detect objects and trees. The usage may be advantageous in case of snow, rain, fog or other visual limiting conditions. The accuracy of object tracking is improved, and false object data can be omitted.

By another invention a method for a production system for forestry application is provided comprising a server and a wireless production network, adapted to be connected to forest machines and vehicles, at least one of each forestry harvester vehicle and one forwarder vehicle, wherein image data is collected by the vehicles, processed onboard the vehicles to identify objects on the images and to provide a time stamp for the images, the images transferred between the production network and the vehicles connected to the network, wherein the method uses the images and the identified objects to determine the progress of the production in the work area and to guide the vehicles and their operators to the next object for processing.

The method allows the operator to compare images of different points in time or different working stages to show the progress or to show the changes. The operator can also use the comparison to find objects or orientation when the environmental conditions change at the work site. The operator is enabled to easily check for logs way marks covered by snow, water, mud or to manually update the production system data and correct false objects. The method allows the manual correction of false automatic data input, but also enables the operator to use the automated object tracking to plan the workload accordingly.

In another example of the invention the images can be displayed to the vehicle operator for personal inspection.

The personal inspection enables the operator to make manual corrections on the object data identified by the software on the processed images. The manual input reduces any possible methodical failure by the camera identification but also aides the operator with correct object tracking and reduces workload and stress due to unclear terrain or environmental conditions due to weather or darkness.

In another embodiment the processed images can visualize the identified objects to the vehicle operator via a vehicle internal display.

The processed images enable the operator to easily identify objects of interest on the images that are displayed, even if the objects are difficult to identify. The production system enables the operator to quickly evaluate the current conditions or the previous condition and to identify any changes to the images and to the surrounding in the working area.

In a further embodiment the images can be collected by a camera and/or lidar and/or radar.

The images can be recorded by a high-resolution camera system, that uses digital imaging technology. The image data can be directly processed by software to extract information about objects on the images. The camera can be a stereo camera which can record also 3D information so that distance of the objects on the images are calculable from the image data. This information can further support the vehicle operator to identify the objects in the work area. The images can also be recorded with a lidar or radar system, which also can include 3D information about the arrangement of the objects in the images. A lidar or radar system may need additional software to extract the information from the recorded images. A lidar system or radar system can operate with more accuracy in certain weather conditions.

In another example of the disclosure the images can be saved in the production network and be available for use to be selected by the vehicle operator.

The method supports an image library sorted by different recorded time stamps so that the operator can select images from a past time and compare these to a current image or to the real surrounding of the vehicle. The operator is enabled to identify any changes and can make logical decisions about the work organization.

Other features and aspects will become apparent by consideration of the detailed description and accompanying drawings.

Before any embodiments are explained in detail, it is to be understood that the disclosure is not limited in its application to the details of construction and the system of components set forth in the following description or illustrated in the following drawings. The disclosure is capable of other embodiments and of being practiced or of being carried out in various ways. Further embodiments of the disclosure may include any combination of features from one or more dependent claims, and such features may be incorporated, collectively or separately, into any independent claim.

DETAILED DESCRIPTION

Figure 1:
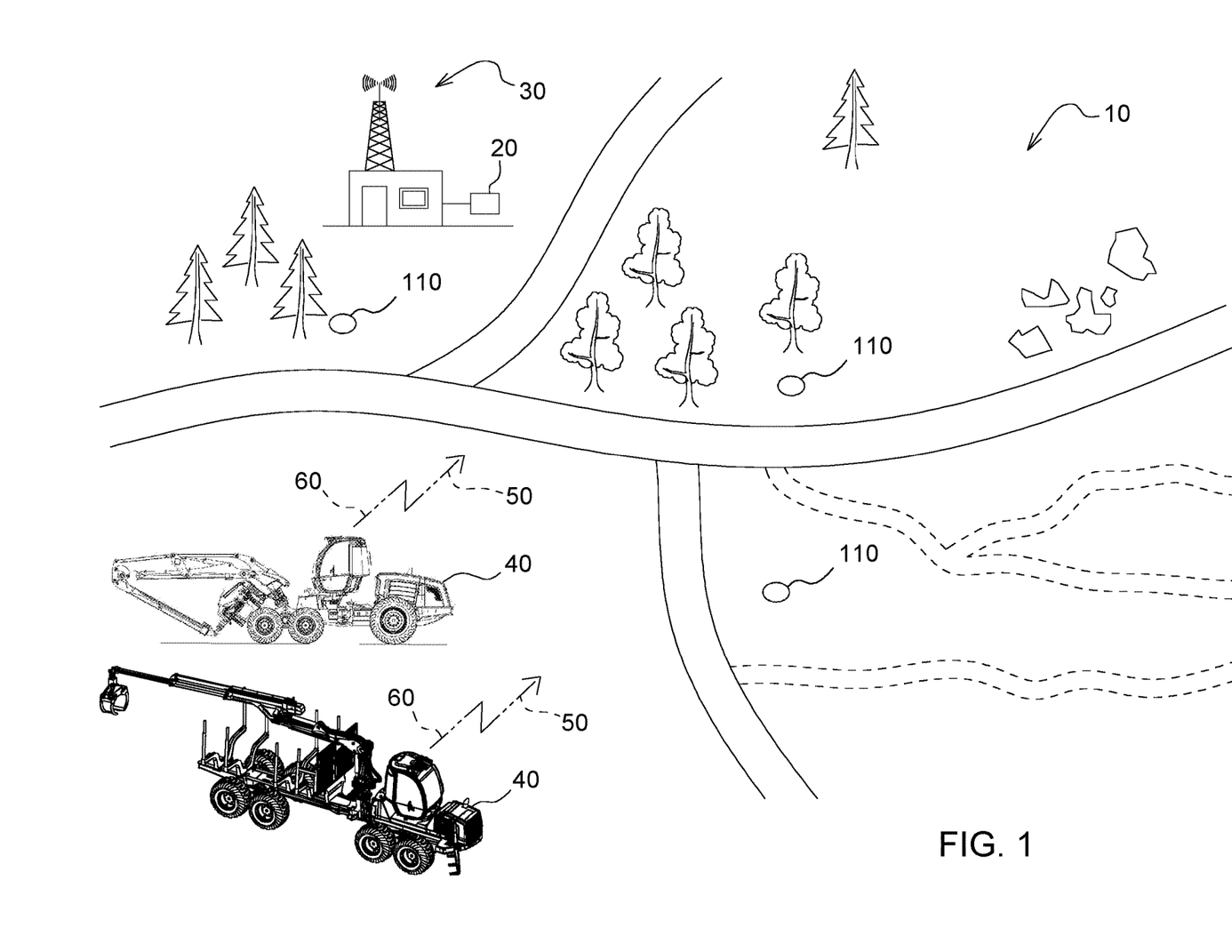
FIG. 1 discloses the production system and the setup in a working area.

A combination of two agricultural machines shown in FIG. 1 comprises a harvesting machine 10 in the manner of a self-propelled forage harvester and a transport vehicle 12 in the manner of a self-propelled tractor, which pulls a trailer 16, which comprises a cargo container 18, by means of a drawbar 14.

FIG. 1 shows the production system 10 depicted in a forest work area. The work area 100 comprises various forest roads to move the machines and vehicle within the work area 100 and to the different work sites 110 of the work area 100. A wireless data connection network 50 is set up in the work area 100, either by a mobile tower that is placed in the area or via other methods, like mobile wireless network units. These can comprise vehicles with the necessary infrastructure or drones for carrying the necessary antennas, receivers, and amplifiers for the network.

The working vehicles 40, forestry harvester vehicles, forwarder vehicles and mobile forestry machines 40 are distributed inside the work area 100. Each vehicle 40 has a current work site 110 assigned to the operator, depending on the process work plan, the respective trees to be delivered and logs on that work site 110 or on other conditions, such as weather or ground conditions.

The production network 30 integrates the work vehicles 40 into the wireless data connection 50 and enables a data exchange between the vehicles 40 and the server 20, the operators and the work planning personnel. The data is distributed from the vehicle 40 to the production network 30 and to each connected vehicle 40 as well as the server 20. The generated data is either evaluated in each vehicle 40 or can be evaluated by the server 20 and distributed with the results to each vehicle 40.

Each vehicle 40 is equipped with a GPS positioning system and a wireless network antenna and at least a CPU to be able to connect to the production network 30 and to send, receive data from the production network 30. The onboard devices, CPU, controller, human interfaces enable the production system 10 to directly interpret the data on board before distribution or enable the production system 10 to distribute the raw data to the production network 30 and server 20. The GPS positioning module allows to identify the vehicles positions. Each vehicle 40 is specifically identifiable in the production network 30.

The vehicle 40 has an on board camera system 90 which records the surroundings of the vehicle 40 and transmits the recordings to an image library on board or on the server 20. Each created image 70 is generated with a time stamp and a location mark so that the image library is organized by time and/or by location. The location is automatically added to the data set of the image 70 with the information from the GPS sensor.

In addition, or as an alternative to the camera system 90, a lidar device can be installed with the necessary resolution for the images or a radar. The camera can also be a stereo camera.

The created image 70 is processed on board the vehicle 40 or transferred via the production network 30 and processed on the server 20 to identify the content of the image 70. Valuable content can comprise tree location, the kind or type of tree, the size of the stem, the density of the trees. Density is defined as trees per area. It can further comprise objects on the ground, already processed logs, log piles, stones, rock formations, terrain information, path identification, foliage.

Tree location is necessary information for work planning and enables an accurate basis. The production system 10 can identify the tree type or the kind of the trees, as well as the size or diameter of the tree stems, which enables a production estimate. The density is advantageous for thinning operations and enables identification of selectable trees for the thinning operation.

The objects on the ground are used to either identify a path or unpassable areas in the work area 100. This further can be used to generate accurate maps for all vehicles 40 and the work planning.

The detection of logs or piles is enabling accurate logistics of the forestry vehicles 40. The vehicle 40 can be specifically assigned to match the size or number of logs on the work site 110 or additional trips can be planned. The size and diameter of the logs determines the use of a specific felling head or harvesting head. It also determines the requirements of the forwarder vehicle 40. Terrain information can also be used to plan the estimated fuel consumption during the workday.

The created and processed images 70 can be stored in a database on the vehicle 40 or on the production network 30 and server 20, available by the wireless data connection 50. The images 70 can be distributed to all connected vehicles 40 and workstations so that every operator and the operation planning personnel will have access to the images 70, the unprocessed as well as the processed ones.

The operator in the vehicle 40 can access the image database, based on a time or based on location input, the location is automatically available via the GPS device. The images 70 provide the operator with a picture of another earlier time stamp so that the operator is able to visually identify differences and similarities between the images 70 and the current situation outside the vehicle 40. The operator can orient himself by the identified differences and similarities and choose the vehicle path or the next work step according to the received and identified information. In case of operating in darkness, the image 70 may provide a picture of the same location recorded during daylight. The operator is enabled to identify the work site with more clarity or to identify the correct path for the vehicle 40.

The work planning in the vehicle 40 for the operator is resulting in less fatigue and stress, as the operator can also identify logs or log piles and obstacles with less effort from the images 70, even during darkness, fog, heavy rain or when the ground is covered in snow or mud.

The operator uses the cabin mounted working display or human interface of the vehicle 40 to control the images 70, processed and unprocessed. The operator can choose how the images 70 are displayed, e.g., two images side by side, only one image, processed or unprocessed.

In case of displaying unprocessed images 70, the operator can make a comparison by visual observance of the current environment and differences to the image 70. The operator can also display a processed image 70, displaying objects and trees, and thus can make out differences with less fatigue or stress and save time.

The production system 10 can use the information from the processed images 70 at the same location and automatically update the available map of the vehicle, distributed via the production network 30. Logs or log piles that have been already transported, unpassable forest roads, obstacles in the work area, such as rocks, swamp areas, steep terrain.

The updated information can be distributed via the production network 30 between the server 20 and the vehicles 40, so that the information is spread in a fast manner and all operators are enabled to make well based decisions, leading to less stress, and less time for reaching the work goals.

Figure 2:
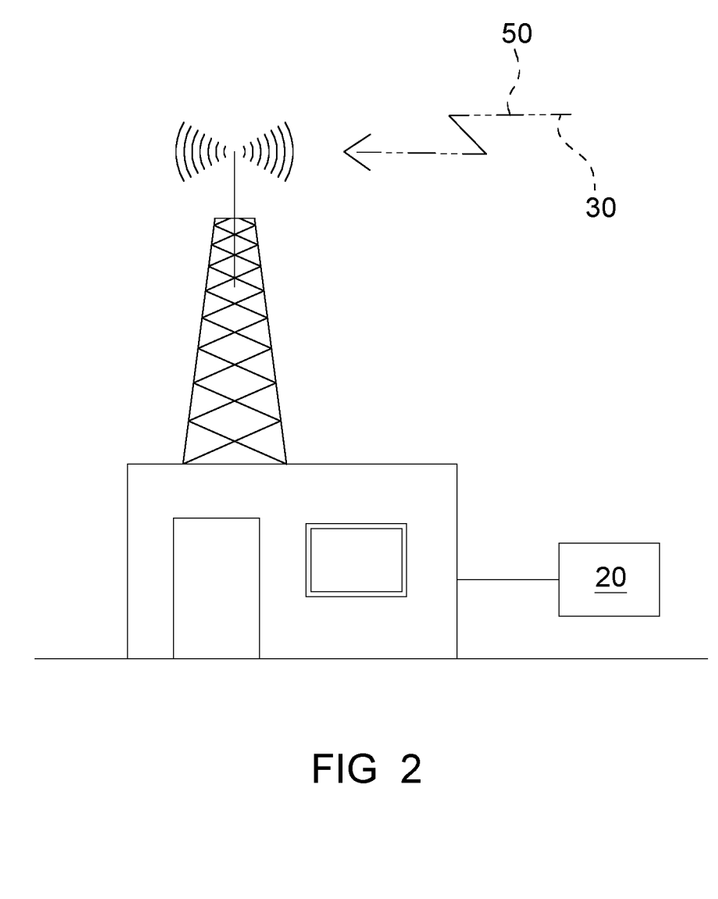
FIG. 2 shows the server-network-workstation setup.

FIG. 2 shows a general setup of the production system 10. The production system 10 comprises a server 20, connected to the production system 10, and a wireless data connection 50, expanding the production system 10 over the work area 100 and connecting forestry vehicles 40 and forestry machines 40 to the production system 10. An antenna or similar can be provided to the production system 10 to extend the network over a widespread area, covering the work area 100. The wireless data connection enables a production network 30, that is connected to all mobile devices and vehicles 40 via the wireless data connection 50. The server 20 and connected workstations can be place in an office space, such as a mobile work container, mobile vehicle, or similar mobile office solutions. The server and workstations enable the work personnel to monitor and control all information transmitted via the production network 30 to the server 20 and the workstations. The forestry vehicles 40 receive data from the server 20 so that the vehicle operator is enabled to get access to the image database and the vehicle 40 is receiving constantly updated information about the work plan, possible routes, and locations.

Figure 3:
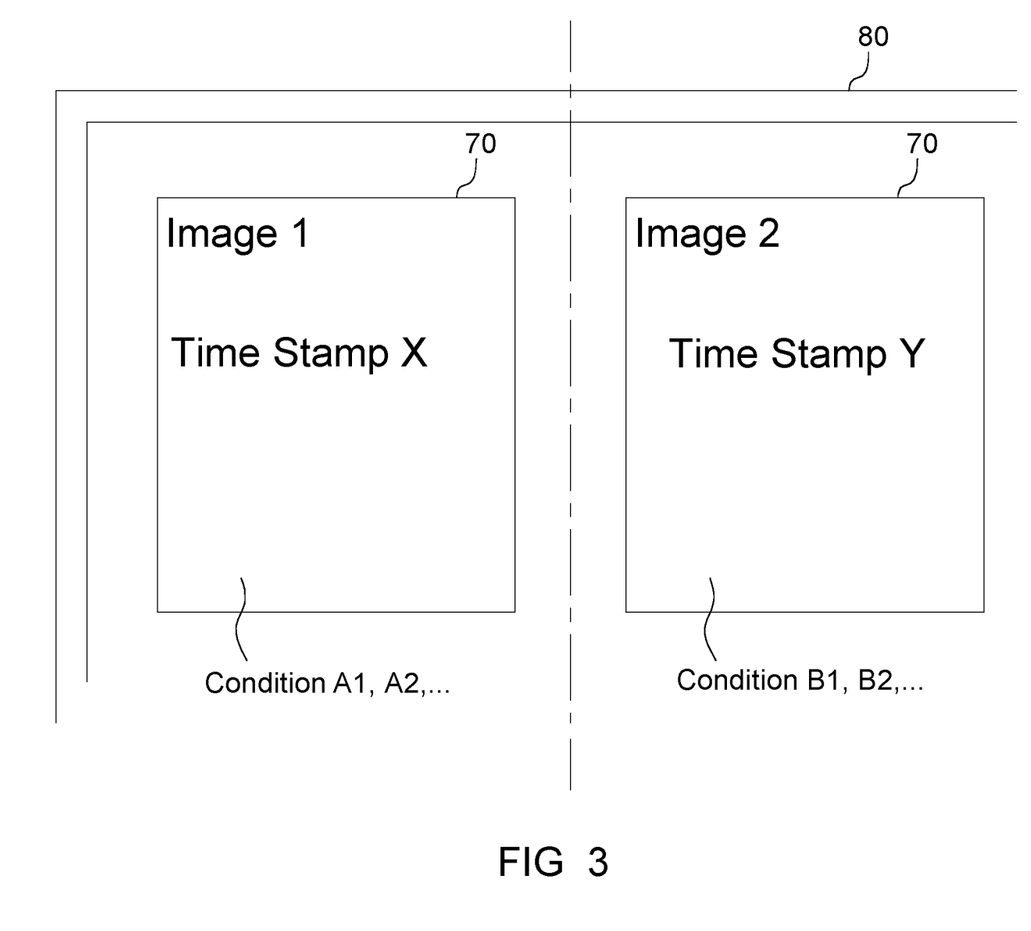
FIG. 3 illustrates the time stamp principle of the images.

FIG. 3 shows the time stamp principle of the images 70 and its display in the vehicle 40. The vehicle 40 comprises a human interface 80 with a display to be able to show and identify the images 70 made by the camera system 90. The display 80 shows at least one but may also show multiple images 70 of the selected scene or environment or point of interest. The selection of the images 70 to be displayed can be made by the operator or is automatically displayed based on the information of the GNSS system relating to the location of the vehicle 40. As visible in FIG. 3 the images 70 are assigned with a time and date to identify the time of record. Thus, each image 70 displays the environment with different conditions A1, A2 and so forth. These conditions can be weather conditions, such as rain, snow, fog or can be light conditions such as dusk, daylight, or nighttime. Other conditions an include different objects that are recorded, such as trees, logs, rocks, or roads and tracks. The production system 10 can be set to display the images 70 in the recorded state and in a processed state where the conditions relating to objects on the images 70 are specially marked for the operator and are further identified by the production system 10 so that the conditions are transferred into the production system calculations such that the production values are updated automatically and are available for further processing. The additional image displays the same scene from the environment but from a different point in time or even in the present time if the first image is of an earlier point in time. The operator can visually compare the images and the differences between the images and is enabled to orient the vehicle and the work planning accordingly. The images as an example can display the same location environment with the present time image 70 showing a snow cover and a second image 70 displaying the same scene without the snow cover from an earlier time. The operator can identify possible log locations under the present snow cover and limit the search area or directly access the log location. The production system 10 reduces the necessary work time for the task and reduces workload for the operator. At the same time the identified logs are displayed in the production system map and eventually shown as removed when the operator has finished loading the logs on a forwarder vehicle 40. Similarly, a new image 70 can be taken by the camera system 90, being transferred and processed by the production system 10 so that new information about the location and identified objects or conditions is distributed to the workstations and connected vehicles 40. The images 70 can also display as a condition the identified tree types so that at a time of limited visibility the correct tree types are identified correctly by the operator by comparing images of a different time stamp with better visibility.

Figure 4:
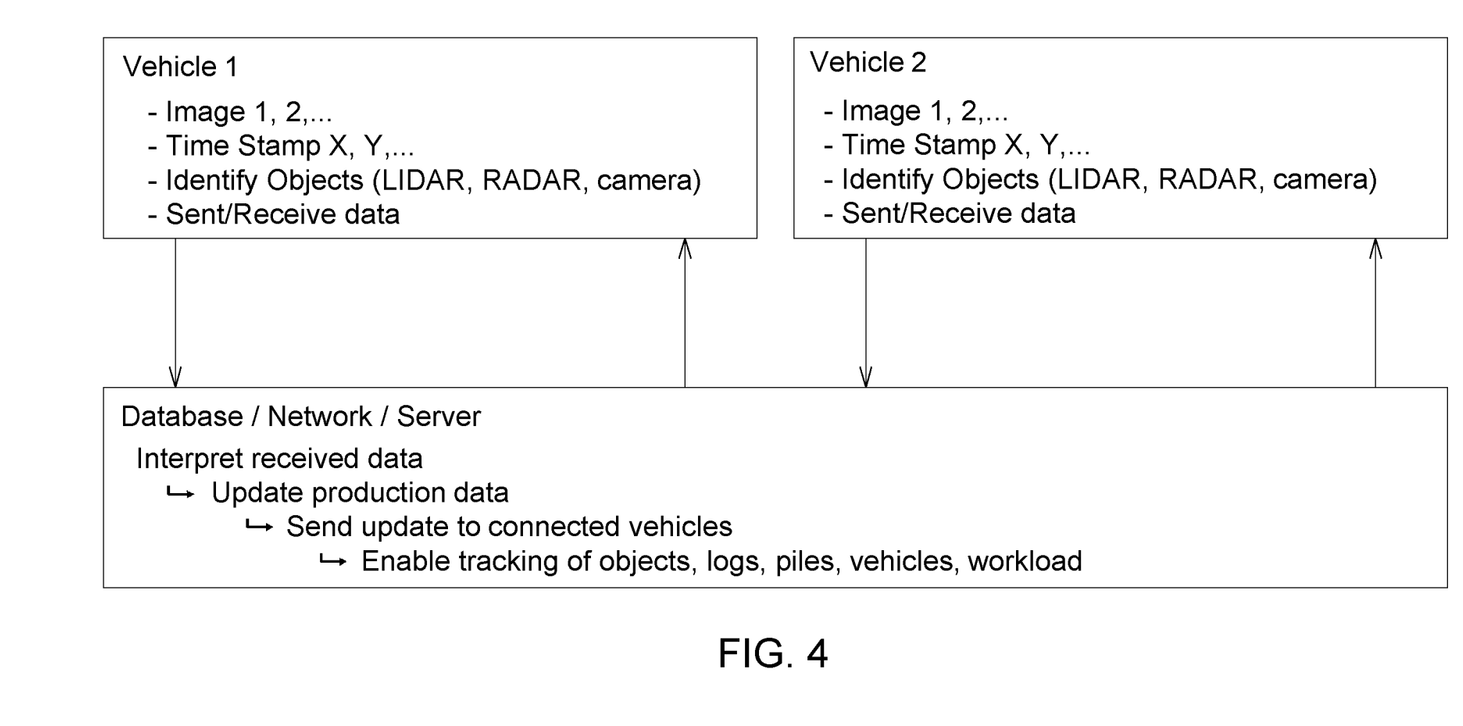
FIG. 4 discloses the schematic process of the image processing.

FIG. 4 shows the schematic process of the image processing by the production system 10. The production system 10 usually comprises more than one vehicle or machine 40 connected to the wireless data connection 50. Every connected vehicle or machine 40 is enabled to contribute to the data set that is managed by the production system 10. As an example, vehicle 1 generates images which are identifiable by the according time stamp and location set via the GNSS module data. These images 70 are then processed on the vehicle 1 to detect objects and conditions on the recorded images 70. The images 70, both the unprocessed version and the process version are distributed to the wireless data connection 50 and further to the server 20 and the production network 30. The images 70 are thus distributed to all connected vehicles and machines 40.

It is also possible that the unprocessed images 70 are directly distributed to the production system 10 without a processing step on the vehicle 70 but the process happening on the server 20 and a subsequent distribution of the images 70 to the connected vehicles and machines 40.

Upon receiving the images and the processed data from these images 70, the server updates the production data of the production system 10. As an example, the server automatically updates the position of logs, the number of remaining log piles or log numbers in a single log pile, the position of the vehicle, the image database. Also, the server 20 automatically updates the tree account, and the corresponding tree types, as well as the tree density. Once the production system 10 has updated the data sets, the new information is also distributed by the wireless data connection 50 so that each operator is enabled to evaluate the latest information about the production values. Also, the workstations of the office personal overseeing the production operation are updated at the same time. This process repeats or rather continuously is ongoing during the operation of the production system 10.

Figure 5:
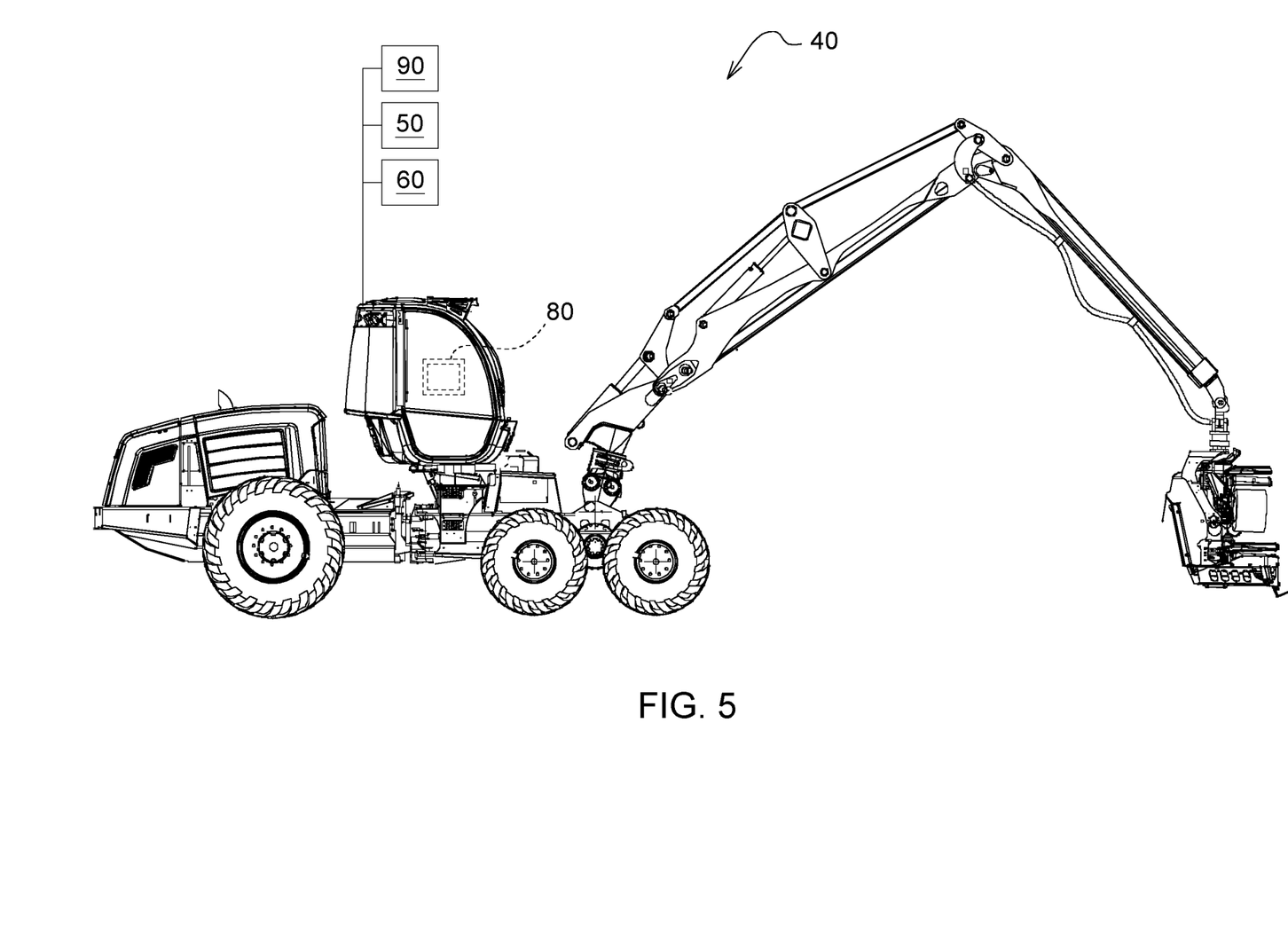
FIG. 5 shows a harvester vehicle adapted for the production system.

FIG. 5 shows a forest harvester vehicle 40. The vehicle 40 has a camera system 90 connected to the on-board human interface 80 and its display. The vehicle 40 also comprises a GNSS system 60. The operator of the vehicle can access the human interface 80 from inside the vehicle cabin. The images 70 taken by the camera system 90 are transmitted in a processed or unprocessed state by the wireless data network connection to the server and received from the server. Once the images 70 are displayed, the operator can evaluate the information of the images itself. The harvester vehicle 40 is used to fell trees and cut the stem into logs for transport and further processing. The operator must have knowledge about the tree location and the necessary tree type. In another case, the operator needs knowledge about the current and to be achieved tree density for thinning operations. Also, the operator needs to know which length the different log types must be. All these functions are provided by the production system 10 and the data transmitted from the server and the connected vehicles as well as acquired information in the planning phase in the work area 100.

Figure 6:
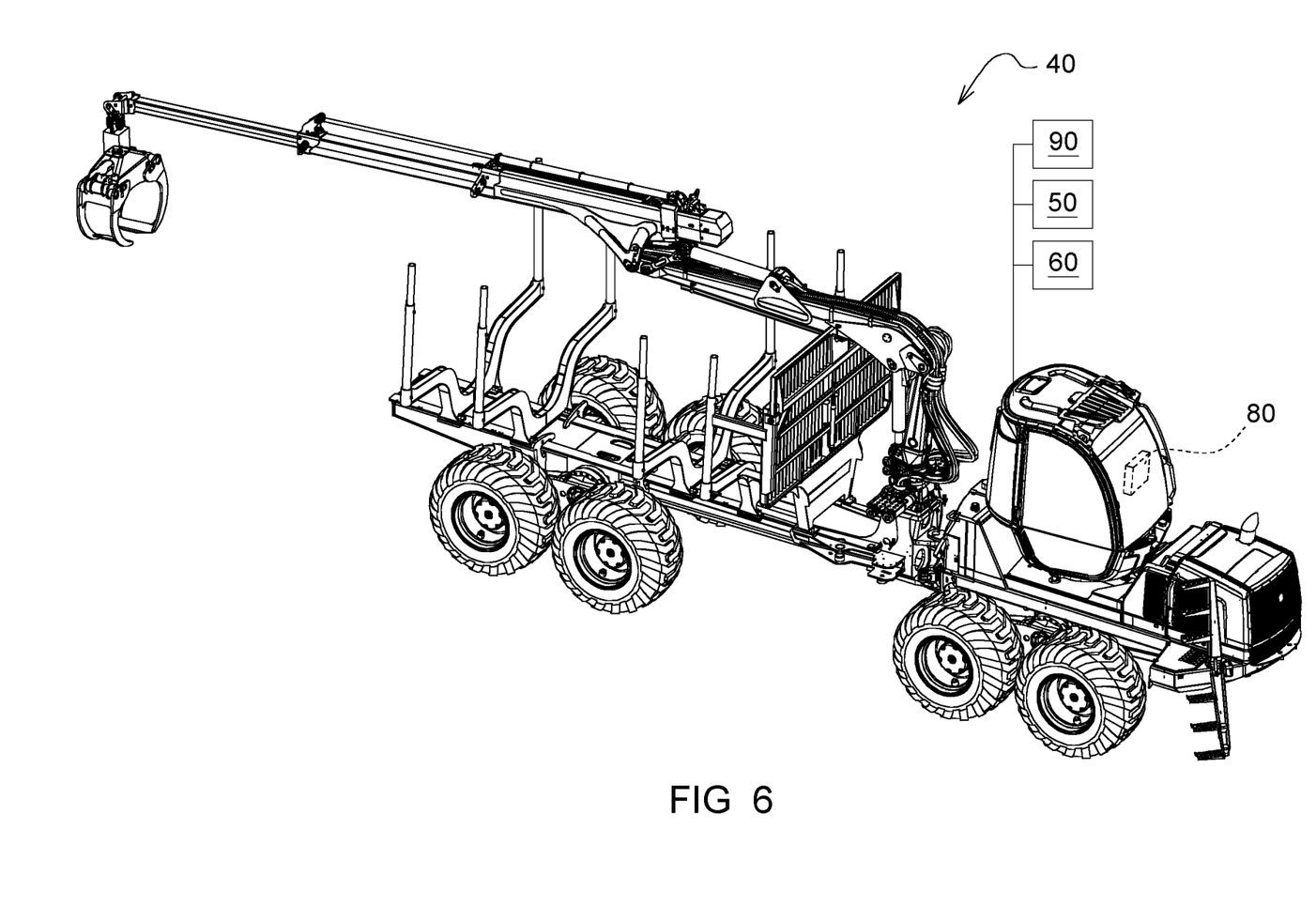
FIG. 6 depicts a forwarder vehicle adapted for the production system.

FIG. 6 show a forwarder vehicle 40 used to load and transport logs from the work site 110 to a road access point. The vehicle 40 has a camera system 90 to be able to detect the surroundings. Like the harvester vehicle 40 of FIG. 5, the production system 10 provides data like log locations, log type, log amount or similar data to be used by the operator of the forwarder vehicle 40. Similar to the harvester vehicle 40, all images recorded by the onboard camera system 90 are distributed by the wireless data connection 50 to the server 20 and all connected vehicles 40 in the production system 10.

Various features are set forth in the following claims.

What is claimed is:

1. A production system for a forestry application comprising:
    a server and a wireless production network;
    at least one forestry harvester vehicle and one forwarder vehicle comprising a GNSS system and a wireless data connection, the wireless data connection in communication with the server and the wireless production network;
    an on board camera system coupled to the at least one forestry harvester vehicle and one forwarder vehicle for recording the surroundings and creating recorded images with time stamps; and
    a display coupled to the forestry harvester vehicle or the forwarder vehicle, the display configured to show the recorded images, enabling images with different time stamps to be compared;
    wherein, the server processes the recorded images to identify objects including one or more of identifying a type of a log, measuring an amount of logs, measuring lengths of logs, or measuring a quality of logs, and shows on the display the changes between the recorded images based on the identified objects and time stamps enabling the identification of one or more of tracks, objects, logs, or log piles;
    wherein, even during a visually impaired condition including at least one of rain, fog, snow, or darkness, the at least one forestry harvester vehicle fells trees and cuts stems to create the logs and the forwarder vehicle loads and transports the logs by using the recorded images.

2. The production system of claim 1, wherein the server is configured to receive the recorded images, identify changes from the processed and time stamped recorded images, calculate a current work site condition, and show the current work site condition on the display in the forestry harvester vehicle and the forwarder vehicle.

3. The production system of claim 1, wherein the server is configured to match object changes from the processed recorded images to a work process of the work site by identifying logs and movement of logs and enable tracking through the work site.

4. The production system of claim 1, wherein the forestry harvester vehicle and the forwarder vehicle, the wireless production network, and the server are in communication so that data and recorded images from each vehicle is added to the wireless production network and each vehicle is enabled to receive data updates on the work site via the wireless production network.

5. The production system of claim 1, wherein the GNSS system transfers a vehicle position by the wireless production network.

6. The production system of claim 1, wherein network data is transferred between the vehicle and the wireless production network by a wireless signal.

7. The production system of claim 1, wherein log identification uses the onboard camera system and a lookup table.

8. The production system of claim 1, wherein the length measurement is facilitated by a felling head of the forestry harvester vehicle.

9. The production system of claim 1, wherein the recorded images recorded by the onboard camera system are processed by software to identify objects.

10. The production system of claim 1, wherein a lidar or radar is provided on at least one of the forestry harvester vehicle or the forwarder vehicle to detect and measure a tree density or objects in the work site.

11. A method for a production system for a forestry application comprising a server and a wireless production network, the server and the wireless production network configured to be connected to a forestry harvester vehicle and a forwarder vehicle, the method comprising:
    providing at least one forestry harvester vehicle and one forwarder vehicle,
    collecting image data with an on board camera system coupled to the at least one forestry harvester vehicle and one forwarder vehicle,
    processing the image data onboard the vehicles to identify objects depicted in the image data, and providing a time stamp for the image data,
    transferring the image data between the wireless production network and the vehicles connected to the wireless production network, using the image data and the identified objects to determine the progress of the production in a work area and to guide the vehicles to the next object for processing wherein the at least one forestry harvester vehicle fells trees and cuts stems to create the logs and the forwarder vehicle loads and transports the logs by using the recorded images during a visually impaired condition including at least one of rain, fog, snow, or darkness.

12. The method for a production system of claim 11, wherein the image data is shown on a display.

13. The method for a production system of claim 11, wherein the processed image data shows the identified objects on a display.

14. The method for a production system of claim 11, wherein the image data is collected by a camera, or lidar, or radar.

15. The method for a production system of claim 11, wherein the image data is saved in the wireless production network, or the server, or connected workstations, and available to a vehicle operator.

* * * * *